Patented Sept. 19, 1922.

1,429,367

UNITED STATES PATENT OFFICE.

GEORGE J. OLTSCH, OF SOUTH BEND, INDIANA.

COMBINED SHOCK ABSORBER AND REBOUND SNUBBER FOR VEHICLE SPRINGS.

Application filed January 14, 1921. Serial No. 437,276.

*To all whom it may concern:*

Be it known that I, GEORGE J. OLTSCH, a citizen of the United States, residing at South Bend, in the county of St. Joseph and State of Indiana, have invented certain new and useful Improvements in Combined Shock Absorbers and Rebound Snubbers for Vehicle Springs, of which the following is a specification.

The invention relates to combined shock absorbers and rebound snubbers for vehicle springs, and has for its object to provide a device of this character, preferably formed from a single piece of material and adapted for use as a connecting means between one end of a semi-elliptic vehicle spring and the frame of the vehicle, and so constructed and connected that upon the initial shock incident to the vehicle moving over a rough surface the elliptic spring will be stretched and the shock taken up, and upon the rebound of the frame, the end of the spring will be flexed downwardly, thereby snubbing the rebound by preventing the upward bowing of the end of the spring.

A further object is to provide a shock absorber and rebound snubber adapted for use in connection with a semi-elliptic spring and frame and forming a connection between one end of said spring and the frame, said shock absorber and rebound snubber comprising a member pivoted to the end of the spring, and pivoted to the frame at a point above the spring and spaced from the end thereof, thereby forming means for stretching the spring on the initial shock and to provide a rigid member carried by the member pivoted to the frame and spring, and engaging the under face of the spring, and forming means for causing the end of the spring to be bent downwardly on the rebound of frame, thereby snubbing the rebound.

A further object is to provide the member engaging the under face of the spring with compressible means for preventing rattling of the engaging members.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of one end of a conventional form of semi-elliptic vehicle spring and a portion of a vehicle, showing the shock absorber and rebound snubber applied thereto.

Figure 2 is an end elevation of the combined shock absorber and snubber, showing the end of the frame and the end of the spring in elevation.

Figure 3 is a side elevation of the shock absorber and rebound snubber showing a modified form of spring engaging means for the snubbing arm.

Figure 4 is a sectional view taken on line 4—4 of Figure 3.

Referring to the drawings, the numeral 1 designates a vehicle frame and 2 a conventional form of semi-elliptic spring, one end of which is pivoted to a fixed point and the other end 3 of which is pivotally connected as at 4 to the lower end of an upwardly and inwardly extending arm 5 of a pivoted bracket 6. The bracket 6 is pivoted as at 7 to the frame 1, at a point spaced from the end 3 of the spring 2 and at a point above the end 3 of said spring. Extending downwardly and inwardly from the arm 5 of the bracket and from a point adjacent the pivotal point 7 is a snubbing arm 8, the lower end of which is bifurcated as at 9, and in which bifurcation a resilient roller 10 is disposed on a transversely disposed pin 11. The end 3 of the spring 2 extends through the bifurcation 9 and through a bifurcation 12 in the lower end of the arm 5 and moves vertically during its flexing action in said bifurcation. The forward end of the frame 1 is disposed in a bifurcation 13, said bifurcations 9, 12 and 13 providing transversely disposed webs 14, which webs brace the sides of the arms 5 and 8, and at the same time form a bracket which will arch the end 3 of the spring and be centrally disposed thereover. The roller 10 engages the under surface of the end 3 of the spring and forms means whereby when the frame 1 rebounds, said rebound will be snubbed by a downward flexing of the end 3 of the spring.

The operation is as follows: Upon the initial shock the arm 5 moves upwardly at its outer end thereby stretching the elliptic spring and taking up the shock. Upon the rebound of the vehicle frame 1, the roller 10 will engage the under face of the end 3 of the spring, thereby, in connection with the arm 5, causing the end 3 of the spring 2 to be bent downwardly, which downward bending of the spring at its end will snub the rebound of the frame 1. By referring to Figures 3 and 4 it will be seen that in this form that, instead of a resilient roller 10, a coiled spring 15 is provided which is normally contracted and interposed between the transverse portion 16 of the arm 8 and the under face of the end 3 of the spring 2. Resilient roller 10 and contracted spring 15 primarily serve the purpose of preventing rattling of the device incident to constant vibration.

From the above it will be seen that a combined shock absorber and rebound snubber is provided which is formed from a single piece of material, simple in construction and one wherein the action is positive and the parts reduced to a minimum.

The invention having been set forth what is claimed as new and useful is:—

1. The combination with a semi-elliptic spring and a vehicle frame disposed thereover, of a combined shock absorber and snubber therefor, said snubber and shock absorber comprising a bracket pivoted to one end of the spring and to the vehicle frame at a point spaced inwardly from the end of the spring, said bracket being provided with a member disposed below the spring at a point spaced from the end of the spring and forming means whereby the end of the spring will be bent downwardly upon the rebound of the vehicle frame.

2. The combination with a semi-elliptic spring and a vehicle frame disposed thereover, of a combined shock absorber and snubber therefor, said shock absorber and snubber comprising a bracket pivoted to the end of the spring, said bracket being pivoted to the frame of the vehicle at a point spaced inwardly from the end of the spring, and a member carried by said bracket and engaging under the spring at a point spaced inwardly from its end.

3. The combination with a semi-elliptic spring and a vehicle frame disposed thereover, of a right angled bracket forming a shock absorber and snubber, said bracket having the end of one of its arms pivoted to the end of the spring, the end of the other arm of the bracket engaging under the spring at a point spaced from its end, said bracket being pivoted to the frame at a point above the spring and intermediate the ends of the arms of the bracket.

4. The combination with a semi-elliptic spring and a vehicle frame disposed thereover, of a combined shock absorber and snubber therefor, said combined shock absorber and snubber comprising a right angled bracket formed from a single piece of material, the end of one arm of said right angle bracket being pivoted to the end of the spring, said bracket having its angling point upwardly disposed and pivoted to the frame at a point spaced inwardly from the end of the spring, the end of the other arm of the bracket being provided with anti-rattling means disposed beneath the spring and spaced from the end thereof.

5. The combination with a semi-elliptic spring and a vehicle frame disposed thereover, of a combined shock absorber and snubber therefor, said shock absorber and snubber comprising a bracket having spaced sides engaging the sides of the spring and the frame, said bracket being pivoted to the end of the spring and the vehicle frame, the pivotal point of the bracket to the vehicle frame being disposed above the spring and spaced inwardly from the end of the spring, and a member carried by the bracket and disposed beneath the spring and disposed at a point spaced from the end of said spring.

6. The combination with a semi-elliptic spring and a vehicle frame disposed thereover, of a combined shock absorber and snubber therefor, said shock absorber and snubber comprising a bracket having spaced sides disposed on each side of the spring and frame, said bracket being pivoted to one end of the frame and to the vehicle frame, the pivotal point of the bracket to the vehicle frame being disposed above the spring and spaced inwardly from the end thereof, and a member carried by the bracket and engaging the under face of the spring at a point spaced from the end of the spring, said last named member being partially compressible thereby preventing rattling incident to vibration.

In testimony whereof I affix my signature.

GEORGE J. OLTSCH.